(No Model.)  
2 Sheets—Sheet 1.
F. F. LANDIS.
COUPLING FOR SHAFTS.
No. 268,807.                    Patented Dec. 12, 1882.
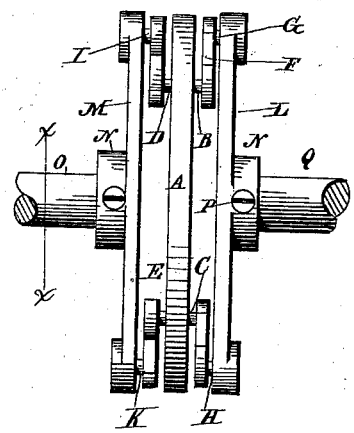
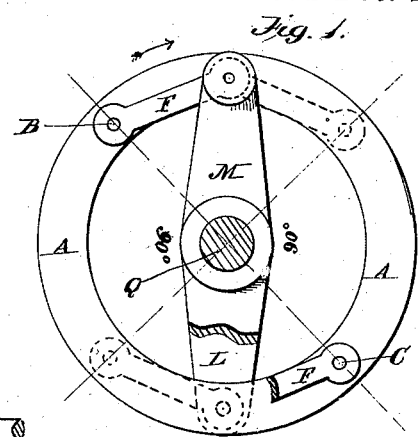
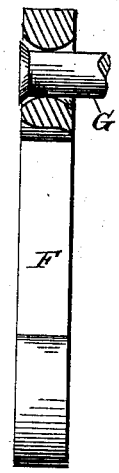
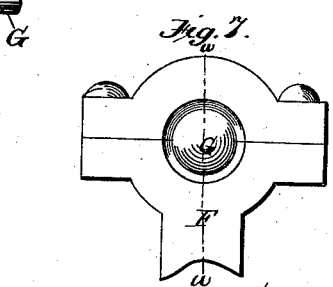
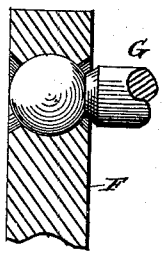
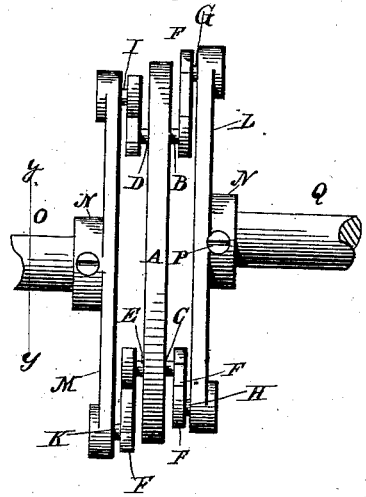
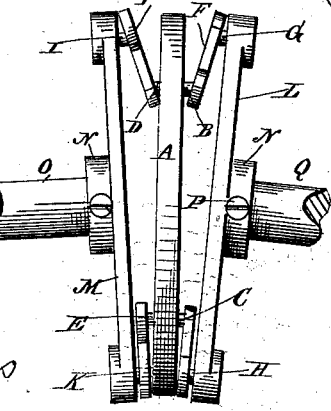
WITNESSES  
W. N. Knight  
Franck D. Johns
INVENTOR  
F. F. Landis  
By H. C. Abbot  
Attorney
N. PETERS, Photo-Lithographer, Washington, D. C.

(No Model.)

F. F. LANDIS.
COUPLING FOR SHAFTS.

No. 268,807. Patented Dec. 12, 1882.

WITNESSES:
F. H. Knight
Franck V. Johns

INVENTOR
F. F. Landis.
By H. T. Abbot.
Attorney

UNITED STATES PATENT OFFICE.

FRANK F. LANDIS, OF WAYNESBOROUGH, PENNSYLVANIA.

COUPLING FOR SHAFTS.

SPECIFICATION forming part of Letters Patent No. 268,807, dated December 12, 1882.

Application filed September 13, 1882. (No model.)

*To all whom it may concern:*

Be it known that I, FRANK F. LANDIS, a citizen of the United States of America, residing at Waynesborough, in the county of Franklin and State of Pennsylvania, have invented certain new and useful Improvements in Couplings for Shafts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 9:
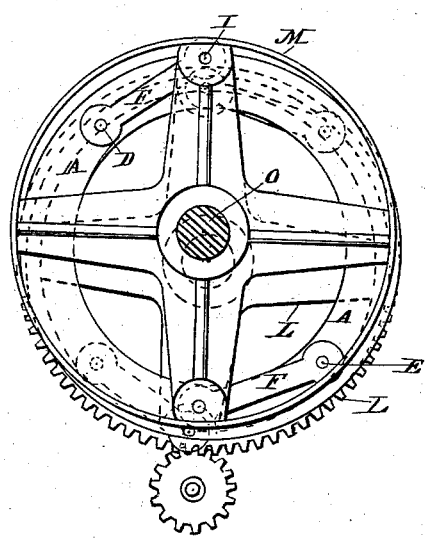
Figure 10:
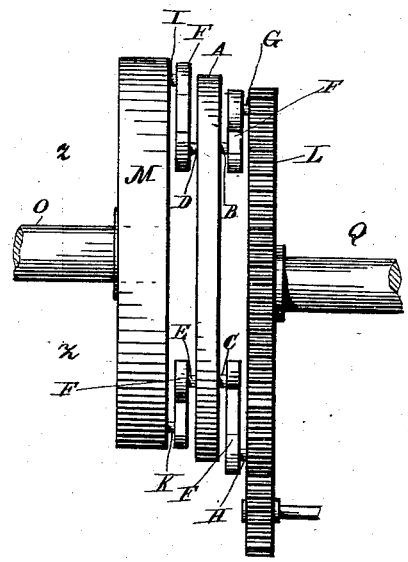

Figure 1 is an end view of shaft and coupling, the two shafts being upon the same line, taken on the line $x\ x$ of Fig. 2, the lower part of the front arm being broken away, so as to expose the other arm directly back of it. Fig. 2 is a side elevation of the coupling with the axes of the two shafts upon the same line. Fig. 3 is an end view of a coupling, taken upon the line $y\ y$ of Fig. 4, showing the relative position of parts with the axes of the two shafts upon different planes, the back arm being shown partly by dotted lines. Fig. 4 is a side elevation of the coupling with axes of the shafts upon different lines, showing the relative position of the various parts. Fig. 5 is a side elevation of the coupling showing the ends of the two shafts at the same elevation, but diverging from a straight line. Fig. 6 shows one of the links, partly in section, disclosing the way of making the connection or attachment to the pin. Fig. 7 is a side elevation of a link, showing a ball-and-socket joint for connection with the pins when desired. Fig. 8 is a section taken on the line $w\ w$ of Fig. 7. Fig. 9 is a view taken on the line $z\ z$ of Fig. 10, showing an end view of a band or other wheel, and a gear-wheel connected. Fig. 10 is a side elevation, showing a band or other wheel connected to a gear-wheel, one of their axes being a little above to one side of a straight line.

My invention relates to couplings for use in any of the various classes of machinery where it is desired to convey motion from one shaft, disk, or wheel to another; and it has for its object more particularly the connection of shafts whose axes do not form a continuous straight line; and it consists of an interposed ring, disk, or frame connected to the ends of the shafts by means of arms, disks, or wheels and links, as will be hereinafter more particularly set forth and claimed.

In order to enable others skilled in the art to which my invention appertains to make and use the same, I will now proceed to describe its construction and operation.

A represents a ring, disk, or frame, of any desired diameter and any required breadth and thickness, of metal, suitable for the purpose and service required. On each side of the ring are two pins, B C and D E. The pins B and C are diametrically opposite to each other, and the pins D and E, on the opposite side of the ring, are each equidistant from the pins B and C, and are diametrically opposite each other, so that there is a pin on alternate sides of the ring to each ninety degrees of the circle. The pins B, C, D, and E may be of any required length and made of any suitable material, steel being preferred, and usually they are provided with a flattened head, as shown in Fig. 6 of the drawings; but for heavy machines, or wherever desired, they may be provided with a ball for entering a socket, as shown in Figs. 7 and 8. These pins may be secured to the ring in any of the various well-known ways suitable for the purpose. A link, F, is hung by one end upon each of the pins B, C, D, and E. These links have an eye in each, and these eyes are beveled or curved from each side to the center, where their diameter is but a little larger than the pins upon which they hang, care being taken to give the bevel or curve a degree of slant or curvature that will enable each link as it hangs upon its pin to have a free movement to and from the ring, in addition to the movement back and forth parallel to the flat side of the ring. This movement is required to enable the coupling to take positions similar to that shown in Fig. 5 of the accompanying drawings, where the axes of the shafts do not form a continuous straight line. The opposite ends of the links are connected in the same manner to headed pins G, H, I, and and K, which are secured to or form a part of the arms, disks, or wheels L and M, and have the same movement parallel to and at right angles to the plane of the ring. The arm, disk, or wheel L is formed with a boss or hub, N, at its center, and is fitted upon the end of the shaft O, to which it is secured by a set-screw, P, and a spline; or any other suitable means of attachment may be used. The arm M is secured to the shaft Q in the same manner as the arm L is secured to the shaft O. These arms, disks, or wheels are of a length equal to the diameter of the ring A, and their connection to the ring in the manner hereinbefore described gives the ring a limited free movement to and from the arms, as well as a movement parallel to them.

Having thus described my invention, I claim as new and desire to secure by Letters Patent—

1. A ring interposed between the ends of two shafts, disks, or wheels, and connected to each shaft by means permitting of a limited movement of the ring independently of the revolving movement of the shafts, disks, or wheels, substantially as described.

2. A ring interposed between the ends of two shafts, disks, or wheels, whose axes do not form a continuous straight line, and connected to each shaft by means permitting of the revolution of the shafts, disks, or wheels, substantially as shown and described.

3. In a coupling, the combination of the arms, disks, or wheels M and L, ring A, and links and pins for connecting the arms and ring, substantially as shown and described.

In testimony whereof I affix my signature in presence of two witnesses.

FRANK F. LANDIS.

Witnesses:
F. H. KNIGHT,
JOHN B. ALTER.